Jan. 6, 1925.
J. F. HENNESSEY
MIRROR CLOCK
Filed July 25, 1923
1,522,241
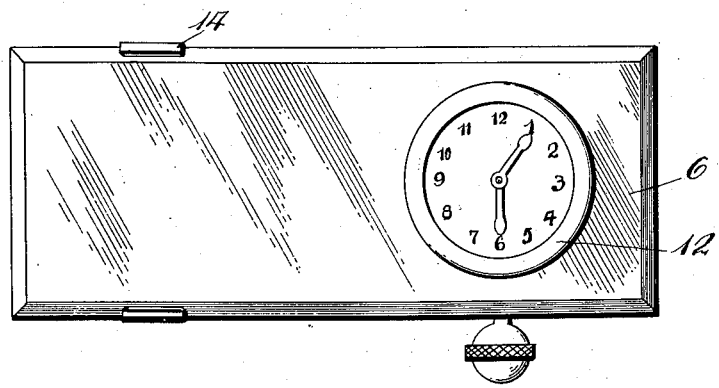
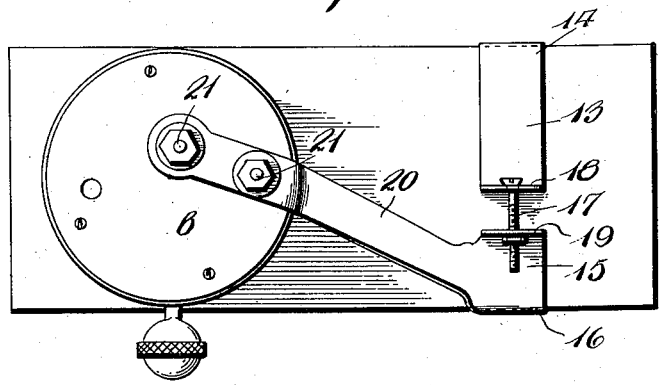
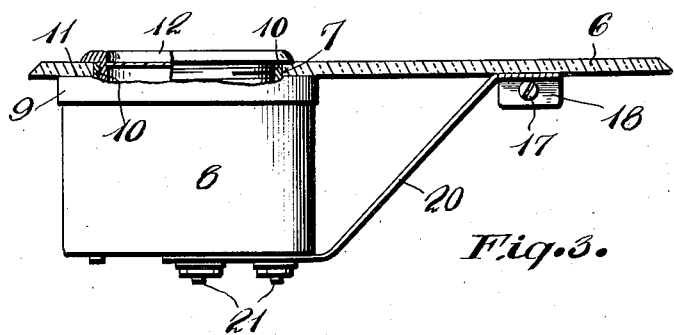
Inventor
John F. Hennessey
By Geo. E. Few
Attorney Patented Jan. 6, 1925.

1,522,241

UNITED STATES PATENT OFFICE.

JOHN F. HENNESSEY, OF FLUSHING, NEW YORK, ASSIGNOR TO PHINNEY WALKER COMPANY, OF NEW YORK, N. Y., A CORPORATION OF NEW YORK.

MIRROR CLOCK.

Application filed July 25, 1923. Serial No. 653,659.

*To all whom it may concern:*

Be it known that I, JOHN F. HENNESSEY, a citizen of the United States, residing at Flushing, in the county of Queens and State of New York, have invented certain new and useful Improvements in Mirror Clocks, of which the following is a specification.

This invention relates to mirror clocks, and has for its object to provide an improved combination of the mirror, clock and supporting bracket, particularly adapted and intended for use on automobiles, in which a mirror is mounted for rear vision, such as on the inside of the top of the windshield, the present invention providing means whereby a clock can be supported on or by the mirror, and so both units will be held in position for convenient observation. This object is effected by making a hole in the mirror, and setting a clock in the opening, with a connecting bracket of some kind to retain the clock in position.

The invention may be realized in various ways, one of which is illustrated in the accompanying drawing wherein Fig. 1 is a face view of the device. Fig. 2 is a rear elevation, and Fig. 3 is a top view, the mirror being shown in section.

In the drawings, 6 indicates a mirror, such for example, as those used on automobiles, and this will be mounted on the vehicle in any suitable way. A hole 7 is cut thru the mirror to receive the front end of a clock case. This clock case 8 is provided at its front end with a flange ring or cap 9, having an extension 10 which fits thru the opening 7 and a shoulder 11 in contact with the back of the mirror, around the edges of the hole. A bezel ring 12 screws on the end of the neck or extension 10, and when it is screwed down tight the mirror is clamped between the same and the shoulder 11. Under some circumstances, this may be sufficient to support the clock in position, but to further assist in this result I provide a bracket connecting the clock and mirror at the rear of the latter. This bracket may be made in various forms, of which the one illustrated in the drawing comprises a clamp one member 13 of which is hooked over the top edge of the mirror as indicated at 14, and the other member 15 of which is hooked over the bottom edge of the mirror as indicated at 16, and these members are connected by screw 17 which extends thru ears 18 and 19 struck up at the adjacent ends of the clamp plates. The plate 15 has an extending arm 12 which is bent outwardly or rearwardly so that its end may be attached to the back of the clock casing 8, as by bolts indicated at 21. This holds the clock case against excessive vibration, takes the strain off the edges of the mirror around the opening 7 and prevents any tendency of the clock to turn in its support.

By the means described, or any equivalent means which may be substituted therefor, the block is mounted and retained in position in the mirror and provides an automobile accessory of good appearance and convenient arrangement.

I claim:

1. The combination of a mirror having an opening therein, a clock the front end of the casing of which fits in said opening, and a bracket attached to the clock case behind the mirror and having an adjustable clamp engaging opposite edges of the mirror.

2. The combination of a mirror having an opening therein, a clock the case of which has a reduced extension fitting thru said opening, a bezel screwed on said extension and against the front of the mirror, a bracket attached to the casing behind the mirror, and a clamp supporting the bracket and adjustably engaging the mirror to hold the bracket in position.

In testimony whereof, I affix my signature in presence of two witnesses.

JOHN F. HENNESSEY.

Witnesses:
F. C. HERBERMANN,
ELMER L. GARDNER.